United States Patent [19]

Swanson

[11] Patent Number: 4,648,969

[45] Date of Patent: Mar. 10, 1987

[54] FLUIDIZED BED APPARATUS

[75] Inventor: Vernon F. Swanson, Longmont, Colo.

[73] Assignee: Western States Minerals Corp., Wheatridge, Colo.

[21] Appl. No.: 703,192

[22] Filed: Feb. 19, 1985

[51] Int. Cl.$^4$ .............................................. B01J 8/34
[52] U.S. Cl. .................................. 210/237; 210/661; 210/283; 210/289; 210/293
[58] Field of Search ............... 210/661, 283, 284, 290, 210/293, 289, 291, 541, 237, 238

[56] References Cited

U.S. PATENT DOCUMENTS

| | | | |
|---|---|---|---|
| 1,151,313 | 8/1915 | Wheeler | 210/293 |
| 1,698,079 | 1/1929 | Wagner | 210/293 |
| 1,770,830 | 7/1930 | Barbour | 210/293 |
| 3,173,862 | 3/1965 | Clements et al. | 210/661 |
| 3,575,294 | 4/1971 | Hirowatari et al. | 210/189 |
| 3,922,152 | 11/1975 | Kookoothakis | 210/284 |
| 4,267,159 | 5/1981 | Crits | 423/371 |
| 4,331,473 | 5/1982 | King, Jr. | 75/109 |
| 4,334,998 | 6/1982 | Rios et al. | 210/617 |
| 4,351,734 | 9/1982 | Kauffman | 210/192 |
| 4,379,711 | 4/1983 | Satchell, Jr. | 436/82 |
| 4,412,923 | 11/1983 | Capitani et al. | 210/661 |

Primary Examiner—Ivars Cintins
Attorney, Agent, or Firm—Fields, Lewis, Pittenger & Rost

[57] ABSTRACT

A fluidized bed plate has been provided which provides uniform flow of a sodium-gold-cyanide or sodium-silver-cyanide solution in gold and/or silver recovery by means of sorbing or desorbing in a fluidized carbon bed. The bed plate comprises a floor grate which supports a screen mesh which in turn supports one or more layers of shot. Carbon particles are supported by the shot. The flow of the fluid is uniform through the mesh and shot because of the arrangement of the voids created between the shot due to their natural stacking characteristics. This fluid flow is effective in fluidizing the carbon particles uniformly with little abrasion. A unique tank design permits desportion of the carbon particles while the tank is temporarily taken off-line. After the tank is reactivated it can be placed back on-line as required. The fluidized bed plate of this invention can be used in a column where processing of the solution in series is desired.

15 Claims, 8 Drawing Figures

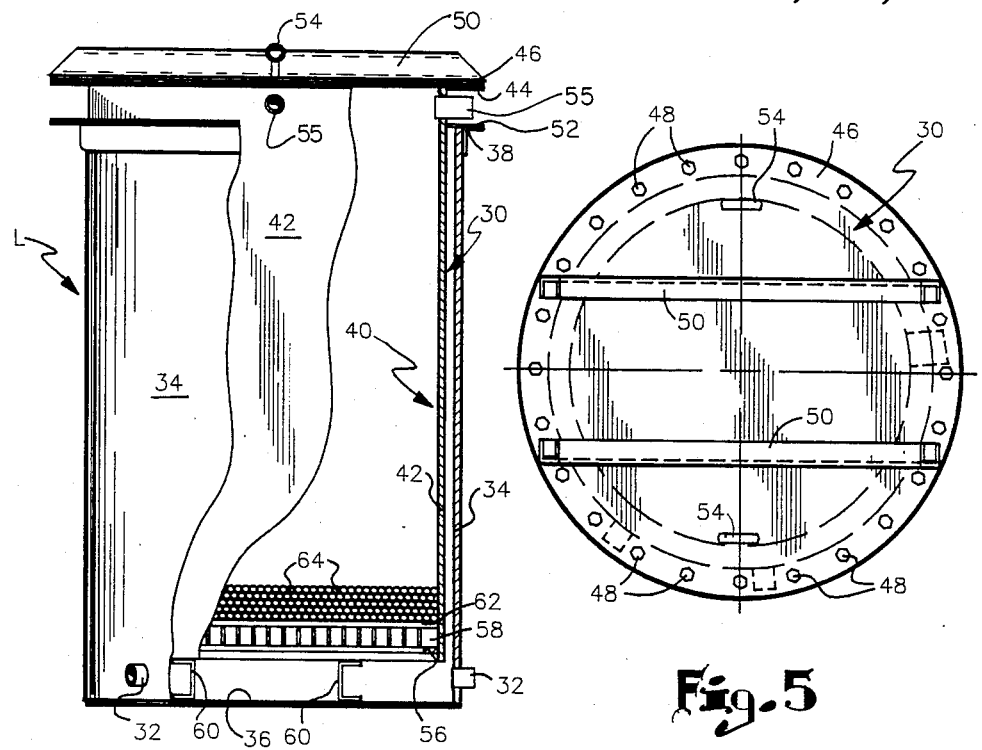
Fig. 4
Fig. 5
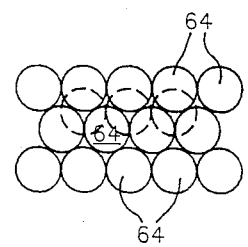
Fig. 7
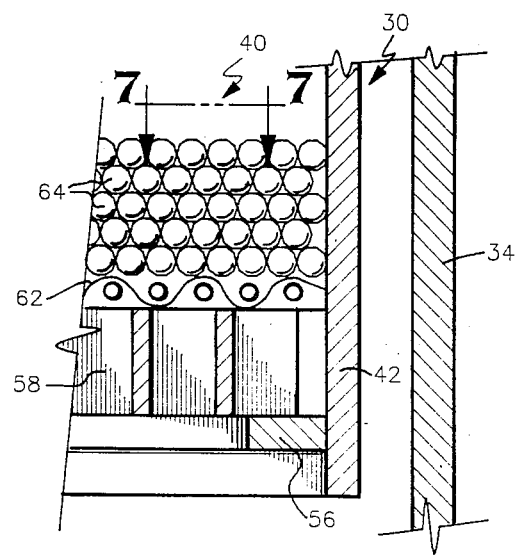
Fig. 6

FLUIDIZED BED APPARATUS

TECHNICAL FIELD

This invention relates to the construction and utilization of fluidized bed apparatus, and more particularly to the utilization of a novel bed plate construction and fluidized bed tank construction.

BACKGROUND ART

A common method for the recovery of gold and/or silver from a sodium-gold-cyanide solution or from a sodium-silver-cyanide solution involves passing the solution through a sorption tank or column containing one or more fluidized beds of particulate material, such as carbon particles which adsorb the gold and/or silver. Subsequently, the the metal-laden carbon is treated by desorption using other fluids to remove the gold and/or silver therefrom.

A common apparatus used in fluidizing the bed of carbon particles involves providing a bed plate at the bottom of the leaching tank. The bed plate includes a plurality of spaced bubble caps. The solution is pumped through the sorption tank from the bottom to top. As it passes through the bed plate the bubble caps serve to deflect the solution in jet streams down against the upper surface of the bed plate and disburse it through the carbon particles to fluidize them and to provide a large surface area of the carbon particles available to the solution for adsorbing gold and/or silver. However, such structure has certain deficiencies in that the force of the fluid directed by the bubble caps against the bed plate causes erosion thereof and the mixing effect caused by the solution flowing through the bubble caps is uneven, resulting in non-uniform fluidization of the carbon particles and also causes the carbon particles, which are relatively soft, to be abraded by the streams of the solution issuing from the bubble caps so that periodically the carbon particles must be replaced because they are continually being broken down.

DISCLOSURE OF THE INVENTION

In accordance with the present invention, a fluidized bed apparatus is provided having a bed plate for use in controlling the flow of fluid through a fluidized bed in a fluid chamber. The fluidized bed apparatus comprises a fluid chamber having an inlet adjacent the bottom thereof and an outlet adjacent the top thereof containing a substantial quantity of particulate material. A porous support is mounted in the chamber above the inlet and at least one layer of closely sized shot covers and rests upon the support. Voids are formed between adjacent shot and the fluid flows through the porous support and the voids to fluidize the particulate material within the chamber and to subsequently flow through the outlet.

More particularly, a sorption tank for absorbing gold and/or silver from the cyanide solution by passing the solution through a fluidized bed of carbon particles is provided. The sorption tank comprises an outer chamber which has a cylindrical wall with an open top and a closed bottom. An inlet is provided adjacent the bottom of the outer chamber for introducing leaching solution into the sorption tank. An inner chamber is provided which has a cylindrical inner wall of less diameter than the cylindrical outer wall of the outer chamber and is receivable therein. The inner chamber has an open bottom and a closed top. An outlet is provided adjacent the top to allow the discharge of the solution after the gold and/or silver has been adsorbed by the carbon. An inner peripheral support ring is provided adjacent the open bottom of the inner wall. A lattice is mounted on the support ring and a foraminous screen is mounted on the lattice. A plurality of layers of spherical shot are supported by the screen and a bed of carbon particles is supported on the shot. The shot is at least 1.0 SGU more dense than the suspended carbon particles and the screen has an opening in the range of 50% to 85% of the diameter of the shot. The shot is arranged to provide a void area which is in the range of between 26.0% to 47.6% void. The arrangement of the shot can be cubic or rhombohedral or a combination thereof.

By this arrangement, the fluid passes through the bed plate with a relatively small drop in fluid pressure and is distributed evenly without substantial abrasion of the bed plate or the carbon particles, resulting in much improved fluidization of the carbon bed and better adsorption of the gold and/or silver into the carbon particles.

Alternatively, a column can be used which has a series of stacked fluidized bed chambers, each including the novel fluidized bed plate of this invention.

Additional advantages of this invention will become apparent from the description which follows, taken in conjunction with the accompanying drawings.

BRIEF DESCRIPTION OF THE DRAWINGS

FIG. 4 is a side elevation of the fluid chamber of FIG. 3, with parts broken away to show further details of the invention;

FIG. 5 is a top plan view of the fluid chamber of FIG. 4;

FIG. 6 is a greatly enlarged, fragmentary section through the lower right-hand corner of the fluid chamber of FIG. 4, showing further details of the fluidized bed plate of this invention;

FIG. 7 is a section, taken along line 7—7 of FIG. 6, showing one possible stacking arrangement of the shot which forms a portion of the bed plate of this invention.

BEST MODE FOR CARRYING OUT THE INVENTION

Figure 1:
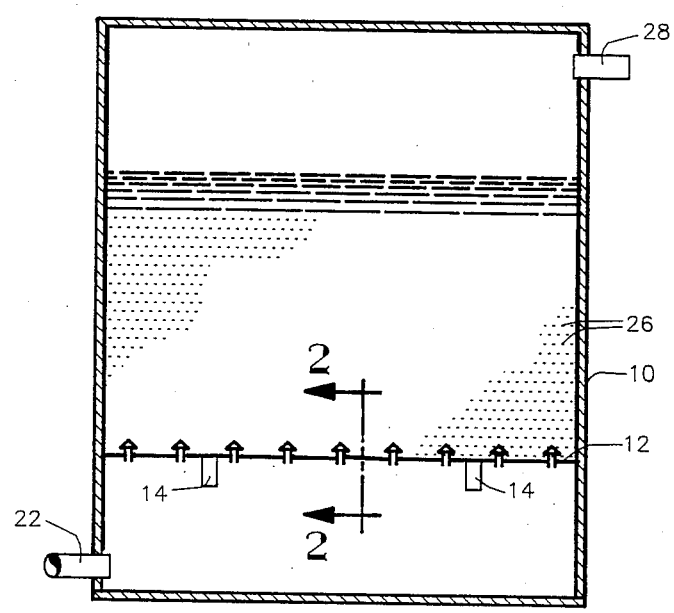
FIG. 1 is a diagrammatic perspective view showing a prior art fluidized bed plate in a fluid chamber.
Figure 2:
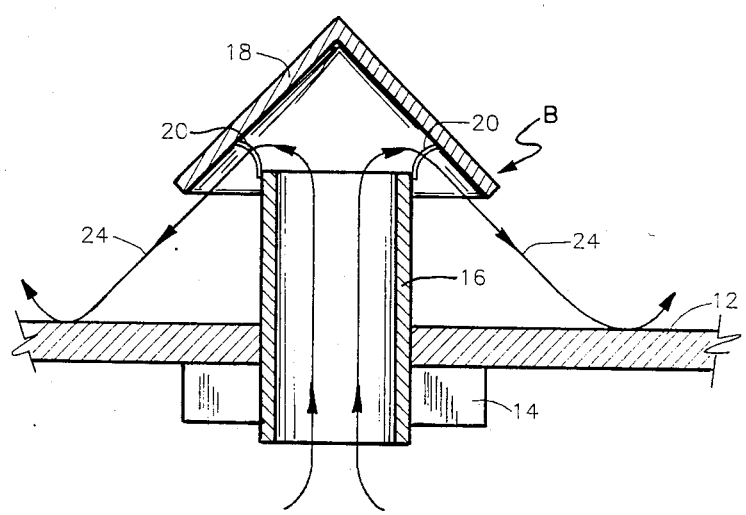
FIG. 2 is a greatly enlarged vertical section, taken along line 2—2 of FIG. 1, showing a bubble cap construction of the prior art, and the flow of fluid therethrough.

In prior art devices for leaching gold or silver from a cyanide solution, as illustrated in FIGS. 1 and 2, a fluid chamber 10 is provided having a fluidized bed plate 12 supported above the bottom of the chamber, as by supports 14. The bed plate is provided with a plurality of spaced bubble caps B. Each bubble cap includes a vertical tubular passageway 16 which extends through the bed plate, and has a deflector 18 on the upper end thereof, which includes a plurality of circumferentially spaced openings 20 through which the fluid is discharged.

It will be understood that fluid can enter the chamber through an inlet 22 under pressure, and is forced up through passageways 16 and ejected at a downward angle in jet streams by deflector 18 through openings 20 against the bed plate, as depicted by arrows 24. The result of this flow of fluid through the chamber is to fluidize a bed of carbon particles 26, and to cause the fluid to generally be disbursed through the carbon particles and ultimately discharged through an outlet, such as outlet 28. When the fluid is not flowing, the solids, i.e., the carbon particles settle into and around the bubble caps B. The angle of repose of the material can inhibit the flow of solids downward through the bubble caps. The bubble cap size and spacing is dictated by the total fluid flow, maximum allowable pressure drop through the bubble caps and maximum permissible agitation of the solids in the bed.

There are several disadvantages of the bubble cap system. In the first place, the fluid flow through the bubble cap impinges onto the bed plate as shown by arrows 24, which over a period of time will cause erosion of the bed plate surface. Eventually, the bed plate will wear through and must be replaced. In addition, there are potential dead spots on the plate where the carbon particles are static because they are not impinged by the jet streams being discharged through openings 20, resulting in poor mixing, in some instances. Considerable capital costs are involved in making and installing the bubble caps. Furthermore, there is non-uniform fluid distribution resulting in low and high velocity zones within the bed. As a result, the sorption process may not be uniform. Finally, the impinging of the fluid against the carbon particles causes them to be abraded, thereby requiring frequent replacement of the carbon bed.

Other bed plate designs have been used in the prior art. Some of these utilize parallel rods or bars, screens and porous or perforated beds in place of the bubble caps. However, these have similar disadvantages and in some instances allow the solid material in the fluidized bed to pass in a reverse direction through the openings in the bed plate when fluid flow is discontinued. As a result, some of the solid particles may clog some of the openings in the bed plate, reducing the efficiency of the bed plate.

Figure 3:
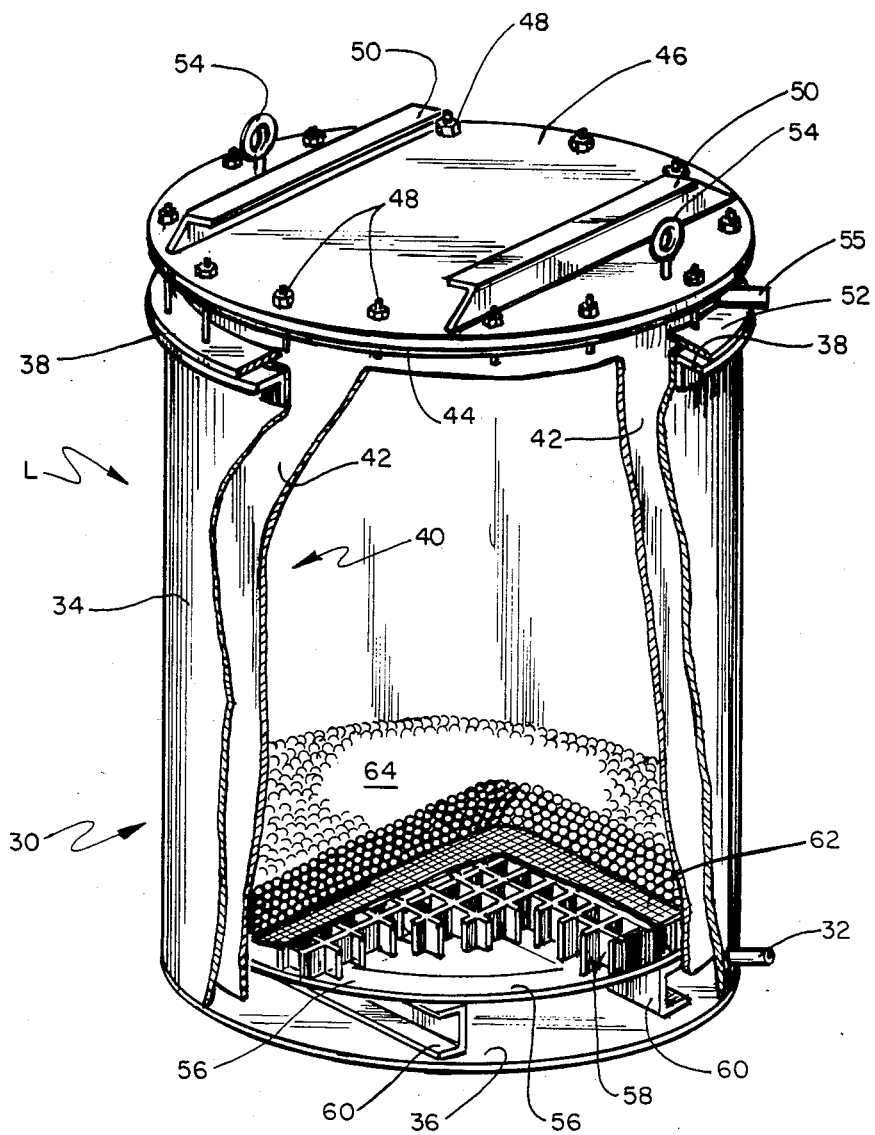
FIG. 3 is a diagrammatical, fragmentary, perspective view of a novel tank design and fluid chamber utilizing the fluidized bed plate of this invention.

In accordance with this invention, a sorption or leaching tank L is provided which includes an outer fluid chamber 30 having one or more inlets 32 at the lower portion of outer sidewall 34 adjacent bottom wall 36. Around the upper peripheral edge of sidewall 34 is a support flange 38, which may be in the form of an angle, as shown in FIG. 4. An inner fluid chamber 40 has a diameter which is slightly less than outer fluid chamber 30, so as to be received therein. The inner fluid chamber includes an inner sidewall 42 having a top flange 44 for supporting a cover 46 which is connected thereto, as by a plurality of bolts 48 angularly positioned around the periphery of the flange, as best seen in FIGS. 3 and 5. The cover also includes a pair of spaced reinforcing angles 50 thereacross to reinforce the top to resist the internal pressure created when fluid flows through the inner chamber, as described below. Spaced downwardly from top flange 44 is a second peripheral holding flange 52 which is attached to the sidewall, as by welding, and supports the inner fluid chamber on support flange 38. A pair of lifting rings 54 are attached to cover 44 for placing the inner fluid chamber 40 within the outer fluid chamber 30 and for removing it therefrom for cleaning, maintenance and repair. One or more outlets 55 are provided through inner sidewall 42 for the discharge of the leaching solution. Conveniently, outlets 55 are located between flanges 44 and 52.

Adjacent the lower end of sidewall 42 of inner fluid chamber 40 is an inwardly projecting support ring 56, attached thereto, as by welding. This support ring supports floor grating or lattice 58. Various size gratings can be used. A particular one that has been found suitable is Blaw-Knox J-21. Channels 60 provide the same protection against pressure for the bottom 36 as the channels 50 do for the cover 46. The floor grating in turn supports a screen cloth 62, preferably having a square mesh. In turn, the screen 62 is used to support one or more layers of spherical shot 64. A mesh stainless steel cloth of suitable mesh, such as 7 mesh, has been found to be satisfactory. The steel shot can vary in size depending upon the size of the solids being supported thereabove, but should be fairly uniform in diameter as for example Globe Steel Abrasives Co. No. S-1320.

The design of tank L just described, allows both adsorption and and desorption of the carbon particles contained therein without having to remove or transport the carbon from one vessel to another. For example, through the use of appropriate external piping and valving (not shown), and at least two bottom inlets 32 and two top outlets 55, a number of tanks, such as two or more, can be used in series. This will provide better adsorption of gold and silver, while one of the tanks is isolated through the external piping and valving for desorption of gold and silver for ultimate recovery as bullion. Such an arrangement allows for continuous operation of the sorption system, whereas with the use of only one tank only a batch operation can be undertaken.

A big advantage of this arrangement is that the necessity of transporting the carbon by eduction or by other means from one vessel to another is eliminated. This transportation of the carbon causes the carbon to be abraded resulting not only in the loss of the carbon itself, but also the loss of the adsorbed gold and silver.

It will be apparent that when the carbon has lost its activity, i.e., its ability to adsorb gold and silver it must be regenerated. In this system, the inner cartridge or tank 40 can be removed from the system and replaced with another cartridge or tank containing new or reactivated carbon, and the entire leaching or adsorption tank L can be placed back into service. Then, at an appropriate time, without disturbing the sorption process, carbon can be removed from the original tank 40 for regeneration and fresh carbon can be loaded into the cartridge, and then the original cartridge or tank is available to be placed in service when needed.

A principal novel feature of this invention is the utilization of closely sized spheres as a porous bed plate. In a system of mono-sized spheres, several ordered arrangements can be obtained, ranging from a simple cubic arrangement with 47.6% voids to a rhombohedral arrangement with 26.0% voids FIG. 7 illustrates rhombohedral packing. It has been determined that by prolonged shaking of mono-sized spheres a practical minimum of 39.5% voids can be created. This is because both the cubic and rhombohedral arrangements are theoretical arrangements which cannot be constructed in practice. The combination of a high percentage of voids, uniform and close distribution of voids, and streamlined shape of spheres creates a bed with very uniform distribution of fluid across the entire bed plate coupled with a low pressure drop across the bed plate.

The further advantage of using closely sized spheres as the key component of the bed plate is that the size of the spheres dictates the size of the voids. For example, in the rhombohedral packing shown in FIG. 7, the maximum diameter sphere that will fit in the void is 0.176 times the diameter of the spheres making up the bed plate. If the bed plate spheres are stacked five deep or greater, it is almost impossible for a particle 0.176D to migrate through the bed, where D is the diameter of the spheres.

Another consideration in selecting the spheres in the bed plate is the specific gravity of the spheres. The spheres should be at least 1.0 SGU more dense than the solids being suspended, and preferably dense enough not to be fluidized themselves, although this is not critical. For example, when solids are fluidized, vertical stratification will occur; i.e., coarser, heavier particles will tend to be near the bottom even if they are fluidized.

The spheres should also be inert in the system, i.e., not affected chemically or physically by either the fluid or the solids in the active zone.

An advantage spheres have over bubble caps is that the fluid passes through the bed at a relatively low and uniform velocity, whereas with bubble caps, localized high velocity jets of fluid enter the bed, causing excessive turbulence and poor mixing at the entrance points, which can abrade soft particles like carbon particles 26.

The turbulence can also disturb the lower part of a bed and impede thorough mixing of the fluid and solids in the lower section. A bed of spheres gives such uniform distribution of fluid that the degree of turbulence in the bed becomes an operator controllable factor.

Pressure drop through a bed 0.7 inches thick and made up of 0.17 inch diameter steel shot was less an 1 inch of water at 27.3 gpm/ft$^2$ using water at 64° F. as the fluid. There was no measurable expansion of the shot bed at that flow. Exit velocity through each void into the bed was approximately 9.1 feet per minute. In comparison, for the same flow, a typical bubble cap bed plate would have a pressure drop of 23 inches of water and an exit velocity through each port of approximately 350 feet per minute. A flow of 27.3 gpm is near the maximum desired for carbon absorption of precious metals.

The support screen should preferably be square mesh with sturdy wire selection, and the openings should be sized about 50% to 85% of the diameter of the shot. This spacing insures a random spacing of the spheres on the screen cloth so there is minimum blockage of flow through the screen support.

If relatively fine solids are to be supported by the bed plate, a multi-tiered arrangement of shot can be utilized, i.e., coarser shot can be placed on the screen, with finer shot placed on top of the first bed of shot. The diameter of the shot in the upper beds should be no smaller than 0.25 times the diameter of the shot upon which it is placed.

In addition to closely sized spheres, cylindrical slugs can be used; the length should be approximately equal to the diameter to assure random placement on the support screen, and free passage of fluid.

Figure 8:
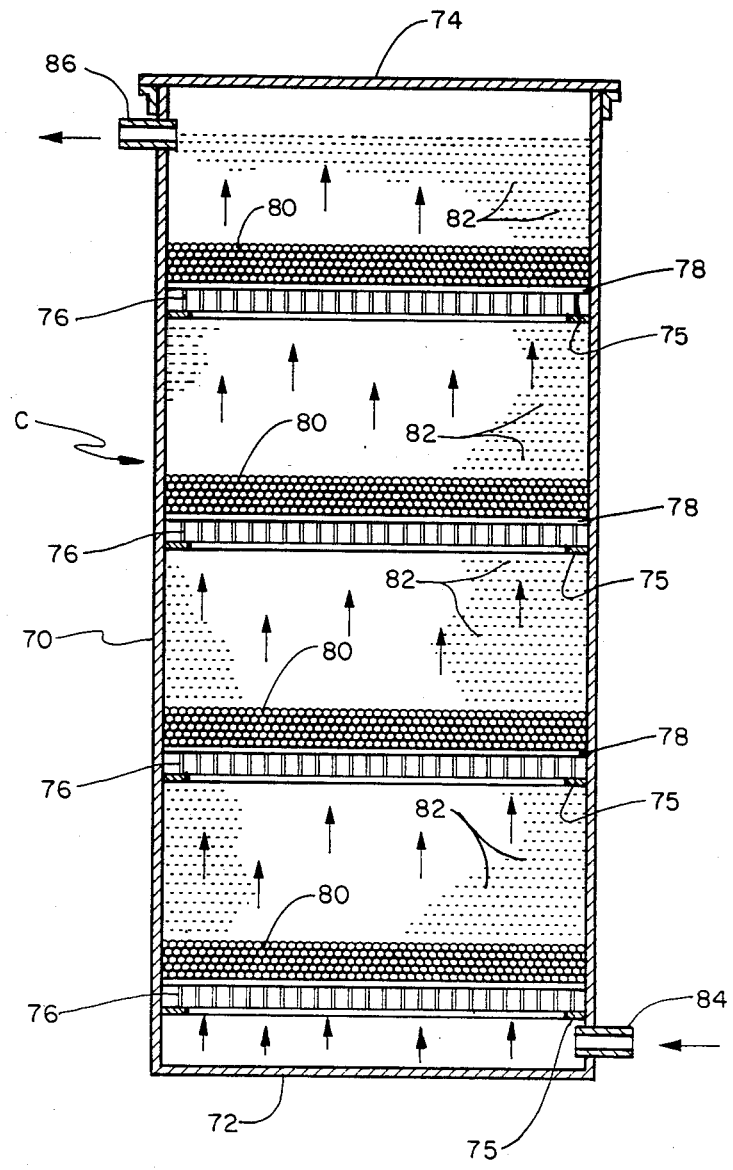
FIG. 8 is a vertical section showing the fluidized bed chambers arranged in a column.

The fluidized bed plates which have been previously described, can be utilized in a column C, as shown in FIG. 8. The column includes a cylindrical sidewall 70 connected to a bottom wall 72 and a top 74 spaced within tank wall 70 are a plurality of support rings 75 each of which supports a lattice or grate 76. A mesh screen 78 is supported on top of the lattice which in turn supports several layers of spherical shot 80. Carbon particles 82 above the shot in each portion of the column are fluidized by the flow of a pregnant solution through inlet 84 at the bottom of column C. The solution is dispersed and flows upwardly through the respective sections of the column whereby the carbon particles adsorb gold and silver from the solution until ultimately a barren solution is discharged through outlet 86 adjacent top wall 74.

The invention has been described by way of example in connection with the use of fluidized beds and fluidized bed apparatus as it is utilized in gold and silver leaching processes. However, it will be understood that the invention described herein can be used in other environments. Examples of these, which are in no way intended to be limiting, are drying of solids, such as rocks, minerals, coal and chemicals. Also, calcining of rocks, minerals or chemicals. Particular examples of this usage are the calcining of lime and phosphate rock. This apparatus can also be used in combustion chambers for coal burning and in catalytic reactions, such as oil cracking. It can also be used in chemical reactions between solids and gases or liquids. All of these usages are apparent to one familiar with the usage of fluidized beds.

From the foregoing, the advantages of this invention are readily apparent. A fluidized bed plate has been provided wherein an even flow of fluid can be obtained so that the fluid flows readily through all portions of the fluid bed and the particles therein to accomplish a highly efficient and uniform leaching process. Furthermore, abrasion of the carbon particles is minimized and there will be virtually no abrasion of the bed plate, because of its novel construction. Also, the fluid flow can be kept at an acceptable level through all portions of the bed plate.

By utilizing the unique tank design of FIGS. 3–6, and by the use of appropriate external piping and valving, the tank can be removed from the system physically or by the valving in order to desorb the minerals which have been adsorbed by the carbon while other tanks are used to carry on a continuous process. After desorption, the tank can be placed back on line, as needed. In the embodiment of FIG. 8, the invention can be utilized in a column.

This invention has been described in detail with reference to a particular embodiment thereof, but it will be understood that various other modifications can be effected within the spirit and scope of this invention.

I claim:

1. A fluidized bed plate for use in controlling the flow of fluid through a fluidized bed in a fluid chamber, the fluid chamber having an inlet and an outlet above said inlet and containing a substantial quantity of particulate material, said bed plate comprising:

a porous support mounted in the chamber between the inlet and the outlet, wherein said support includes a screen with uniformly spaced openings across its surface;

a quantity of particulate material in said chamber above said support; and a plurality of layers of shot uniformly covering and resting upon said support, voids being formed between adjacent shot, said fluid being flowable from said inlet through said porous support and the voids between shot, to fluidize said particulate material within said chamber, and flowable out through said outlet.

2. A fluidized bed plate, as claimed in claim 1, wherein:
said shot is cylindrical slugs.

3. A fluidized bed plate, as claimed in claim 1, wherein:
said shot is spherical.

4. A fluidized bed plate, as claimed in claim 3, wherein:
said shot is stacked in a substantially rhombohedral arrangement.

5. A fluidized bed plate, as claimed in claim 3, wherein:
the uppermost layers of shot are of smaller diameter than the bottom layers of shot.

6. A fluidized bed plate, as claimed in claim 1, wherein:
said shot is stacked in a substantially cubic arrangement.

7. A fluidized bed plate, as claimed in claim 1, wherein said porous support further comprises:
a lattice structure adjacent said bottom of said chamber for supporting said screen.

8. A leaching tank for sorbing or desorbing gold and/or silver from or to a cyanide solution by passing the solution through a fluidized bed of carbon particles, said leaching tank comprising:
an outer chamber having:
a cylindrical outer wall with an open top and a closed bottom; an inlet adjacent said outer chamber bottom for introducing the solution into said tank;
an inner chamber having:
a cylindrical inner wall of less diameter than said cylindrical outer wall of said outer chamber and being receivable therein, and having an open bottom and closed top;
an outlet adjacent said top of said inner chamber to allow discharge of said solution after the gold and/or silver has been adsorbed or desorbed therefrom;
an inner peripheral support ring adjacent the bottom of said outer wall;
a lattice mounted on said support ring;
a foraminous screen supported on said lattice;
a plurality of layers of spherical shot on said screen; and
a bed of carbon particles on said shot.

9. A leaching tank, as claimed in claim 8, wherein:
said shot is at least 1.0 SGU more dense than the suspended particles.

10. A leaching tank, as claimed in claim 8, wherein:
the screen has openings in the range of 50% to 85% of the diameter of the shot.

11. A leaching tank, as claimed in claim 8, wherein:
the shot is arranged to provide a void area which is in the range between 26.0 and 47.6.

12. A leaching tank, as claimed in claim 8, wherein said inner chamber includes:
means for lifting said inner chamber out of said outer chamber.

13. A tank for passing a solution through a fluidized bed of particulate material, said tank comprising:
a cylindrical chamber having an upper end and a lower end, with at least one inlet adjacent the lower end and at least one outlet adjacent the upper end;
a fluidizable bed of particulate material below said outlet; and
a fluidizeable bed plate for supporting said particulate material, said bed plate comprising:
a lattice supported within said chamber above said inlet;
a screen supported on said lattice
a plurality of layers of spherical shot spread uniformly on said screen said shot supporting said particulate material and causing it to be fluidized when the solution flows from said inlet to said outlet.

14. A tank, as claimed in claim 13, further including:
a ring attached to said chamber above said inlet for supporting said lattice.

15. A tank as claimed in claim 13, further including:
a plurality of said fluidized bed plates stacked within and coextensive with said chamber between said inlet and said outlet so that the solution passes from the particulate material above one of said bed plates through the bed plate thereabove in series from said inlet to said outlet.

* * * * *